(12) United States Patent
Tierney et al.

(10) Patent No.: US 12,327,070 B2
(45) Date of Patent: *Jun. 10, 2025

(54) CLOUD-ENABLED GENERATION OF CONSTRUCTION METRICS AND DOCUMENTATION

(71) Applicant: Autodesk, Inc., San Francisco, CA (US)

(72) Inventors: Patrick Liam Colm Tierney, Berkeley, CA (US); Abhijit Oak, Orinda, CA (US)

(73) Assignee: AUTODESK, INC., San Francisco, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 18/046,819

(22) Filed: Oct. 14, 2022

(65) Prior Publication Data

US 2023/0065286 A1 Mar. 2, 2023

Related U.S. Application Data

(63) Continuation of application No. 15/331,212, filed on Oct. 21, 2016, now Pat. No. 11,481,526.

(51) Int. Cl.
*G06F 30/13* (2020.01)
*G06Q 50/08* (2012.01)
(Continued)

(52) U.S. Cl.
CPC .............. *G06F 30/13* (2020.01); *G06Q 50/08* (2013.01); *G06F 9/44526* (2013.01); *G06F 2111/02* (2020.01)

(58) Field of Classification Search
CPC .. G06F 30/13; G06F 9/44526; G06F 2111/02; G06Q 50/08
See application file for complete search history.

(56) References Cited

U.S. PATENT DOCUMENTS 8,266,005 B2 9/2012 Lopez et al.
2005/0038636 A1 2/2005 Wakelam et al.
(Continued)

FOREIGN PATENT DOCUMENTS

CN 203966217 U * 11/2014
CN 105094818 A * 11/2015
(Continued)

OTHER PUBLICATIONS

Definition of "Building Information Model", Wikipedia, Apr. 19, 2020.

*Primary Examiner* — Chuen-Meei Gan
(74) *Attorney, Agent, or Firm* — Gates & Cooper LLP

(57) ABSTRACT

A method, apparatus, system, and computer program product generates construction metrics. Building means, methods, and limitations of construction for one or more companies are gathered in a computer. A digital building information model (BIM) is acquired. Fabrication and construction parameters are extracted from the BIM. Construction metrics (for the BIM) are generated by combining the building means, methods, and limitations with the extracted fabrication and construction parameters. The construction metrics are then visualized in a modeling application and/or used to output construction process documentation.

20 Claims, 9 Drawing Sheets

(51) Int. Cl.
  *G06F 9/445* (2018.01)
  *G06F 111/02* (2020.01)

(56) References Cited

U.S. PATENT DOCUMENTS

| | | |
|---|---|---|
| 2008/0249756 A1 * | 10/2008 | Chaisuparasmikul .. G06F 30/20 703/13 |
| 2011/0054652 A1 | 3/2011 | Heil |
| 2011/0307281 A1 * | 12/2011 | Creveling ............ G06Q 10/063 707/790 |
| 2013/0218780 A1 | 8/2013 | Buzz |
| 2015/0234377 A1 | 8/2015 | Mizikovsky |
| 2015/0324940 A1 | 11/2015 | Samson et al. |
| 2016/0189089 A1 | 6/2016 | Iyer |
| 2016/0343140 A1 | 11/2016 | Ciprari et al. |

FOREIGN PATENT DOCUMENTS

| | | | | |
|---|---|---|---|---|
| CN | 105930973 | | 9/2016 | |
| JP | H0934946 A | * | 2/1997 | |
| JP | 2003295755 A | * | 10/2003 | |
| JP | 2015118535 A | * | 5/2015 | |
| KR | 20130047776 A | * | 5/2013 | ......... G06Q 30/0283 |
| WO | WO 2004070526 A2 | * | 8/2004 | ............. G06F 30/00 |
| WO | WO 2007091835 A1 | * | 8/2007 | ........... G06Q 10/103 |
| WO | WO 2012145788 A1 | * | 11/2012 | ........... G06Q 10/063 |

\* cited by examiner

CLOUD-ENABLED GENERATION OF CONSTRUCTION METRICS AND DOCUMENTATION

CROSS-REFERENCE TO RELATED APPLICATIONS

This application is a continuation under 35 U.S.C. § 120 of application Ser. No. 15/331,212, filed on Oct. 21, 2016, (now U.S. Pat. No. 11,481,526 issued on Oct. 25, 2022) with inventor(s) Patrick Liam Colm Tierney and Abhijit Oak entitled "Cloud Enabled Generation of Construction Metrics and Documentation," which application is incorporated by reference herein.

BACKGROUND OF THE INVENTION

1. Field of the Invention

The present invention relates generally to building information models (BIMs), and in particular, to a method, apparatus, system, and article of manufacture for generating construction metrics and documentation for a BIM.

2. Description of the Related Art

The cost and construction time, measured in both absolute estimates and probability distributions, of BIMs, including off-site fabrication, material, sourcing, and on-site construction, is referred to herein as "construction metrics." Such construction metrics are needed by multiple parties in the construction process (e.g., to enable bidding, manage time, etc.). Prior art systems fail to provide useful construction metrics in several ways: first, they do not provide metrics quickly and at design time; second, they are not as accurate as a detailed manual estimate; third, the uncertainty of the estimates (the probability the estimate will be incorrect) is not displayed to a user; and finally they don't offer metrics for multiple project collaborators. In addition, prior art systems fail to provide the ability to efficiently generate and exchange construction documentation for use by the parties involved in the construction process. Accordingly, what is needed is the capability to easily, efficiently, and accurately determine construction metrics, generate documentation, and enable the exchange of such documentation for a building design/project. To better understand the problems, a description of prior art systems and document generation may be useful.

Construction metrics are required by members of the architecture, engineering, and construction (AEC) industry to both bid their respective schemes to clients, and to control target cost throughout the realization of a building. Despite the necessity of these metrics, architects and engineers have few tools to generate this information, and typically estimate their costs from square-footage values alone. More specifically, the square footages of various parts of a building are calculated, and construction metrics are then estimated using simple formulas such as a direct multiplier. Members of the AEC industry have variations on how they solve this. Architects and structural engineers extract square footages from drawings during the initial design phases. Later in the design process, they may send their model directly to contractors, who respond with more precise construction metrics. Fabricators, erectors, and contractors construct more detailed "take offs" to generate construction metrics. These companies extract unit counts, linear measurements, and square footages of all building components. These measurements item counts are then used to calculate final costs through summation, similar to an invoice or receipt. Thus, building contractors may produce detailed cost and schedule estimates. However, these values are kept on a contractor's internal network. Both generating and sharing these estimates is a mutual, time-consuming process, and only provides construction metrics for one construction company at one state of a BIM.

Several prior art tools exist that assist in the estimate generation process. For example, CAD drafting software may be used to extract square footages from plan drawings, either manually with area measurement commands or with application programming interface (API) scripts, both of which extract out the areas of closed lines or polygons. The user may then manually multiply these areas by historical construction metric values.

Another tool includes plan estimation software (such as PLANSWIFT and ETAKEOFF) that assist contractors with the extraction of measurements from plan drawings. This type of software works by importing plan drawings and offering tools to the user to manually trace counts, lengths, and areas, tagged with their respective building component types. The user inputs unit rates for each of the measured materials, and these are multiplied to derive a final estimate.

An additional tool is that of table or spreadsheet-based estimation (e.g., EXCEL, FABSUITE, FABTROL, HCSS, HEAVYBID, etc.) that assists in the process of generating final costs from building measurements. The spreadsheets correlate extracted values with unit rates gathered from material suppliers.

Further tools include BIM modelers that can generate estimates using a bill of materials produced from the BIM elements. The materials from the bill of materials are cross-referenced with known average material prices and installation times to generate construction metrics.

Construction companies may also have modeling tools that generate construction estimates from low resolution conceptual models (e.g., the DESTINI PROFILER application by BECK TECHNOLOGIES, the CONXTECH CONFIGURATOR application, etc.) to generate costs and schedule information from a conceptual model using an automated method integrated into their modeling application. Note that the generated metrics are for the particular contractor who wrote the tool, and are not accurate for any other contractors.

Another tool is the SIGMA ESTIMATES tool that works similar to the FABSUITE/FABROL/HCSS HEAVYBID suite of tools (e.g., table or spreadsheet based tools) described above. Such tools provide an estimate through square footage measurements that are extracted out of a BIM model directly, rather than having to extract the measurements manually from drawings.

However, all of the above described tools merely and only generate metrics locally. Drawings and plans must be gathered from external components, and final generated metrics must be transmitted out (e.g., typically via email or other file transfer methodologies [e.g., ftp—file transfer protocol, BOX, DROPBOX, etc.]). Further, these existing tools require human input (that are not real time). Finally, all of the above described tools merely and only generate metrics for a single contractor. The rates and multipliers used in their equations are tailored for the specific contractor, fabricator, or installer using the product.

With respect to construction process documentation, the specific processes used to construct buildings by a particular construction company (e.g., general contractor or sub-contractor) is crucial to on-time and on-budget execution.

Sub-contractors need to understand the work expectations of the general contractor, who coordinates between sub-contractors based on expectations of how a task is completed. These expectations are currently located in two sources: contract documents exchanged between companies, and learned knowledge of experienced tradesmen who have worked with a contractor before. Each of these sources have problems. Contracts between companies only describe construction steps in a general sense, and don't describe the steps that define the particulars of a project. This must be either improvised on the job site, or resolved after communication with the general contractor. Learned knowledge of tradesmen is a transient way to record this information. The information isn't available when tradesmen aren't working on a project, and is lost when they retire.

Additionally, for buildings with large numbers of pre-fabricated components (such as prefab steel frames or glued laminated timber), it is even more important that a specific construction process is executed correctly. Pre-fabricated components are often more complex than traditional construction components, and tradesmen may not be experienced with the construction process of a specific pre-fabricated system. Despite the prior art ability to generate custom components for every project (for instance through generative design applications such as DYNAIVIO™ or GRASSHOPPER™), these technologies have not been applied to construction process documentation. Construction process documentation must be manually generated through drawings, diagrams, and written descriptions.

Existing tools to generate construction process documentation are either general enough to support any BIM, or contain comprehensive detailed information about the particular geometry for a BIM with every construction step documented, but not both.

In view of the above, one may note that prior art systems fail to provide an automated real time dynamic mechanism for creating construction metrics without manual human input and that is not limited to a single contractor. Further, prior art systems fail to generate construction process documentation that is useful across multiple BIMs and specific BIMs.

SUMMARY OF THE INVENTION

Embodiments of the invention solve two construction metrics-related problems: the limited spectrum of estimates, and the latency between generating a BIM and receiving an estimate from the contractor. Three components provide such advantages—(1) an interface used to gather construction information from individual construction companies; (2) a set of plugins that extract detailed information from a BIM; and (3) a cloud-based estimator that processes the extracted detailed information and combines such information with the individual construction company information to generate construction metrics.

In addition, embodiments of the invention address the problem of construction process documentation. In particular, construction process documentation for a BIM is automatically generated using information captured about the fabrication process (e.g., from the individual construction companies). This gives the particular construction process documentation for the geometry and materials of the BIM.

BRIEF DESCRIPTION OF THE DRAWINGS

Referring now to the drawings in which like reference numbers represent corresponding parts throughout:

FIG. 6 illustrates an exemplary user interface on a website for entering rate information in accordance with one or more embodiments of the invention;

FIG. 7 illustrates a user interface displaying entered rates with the option to edit such rates in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention generate construction metrics automatically across the industry for many contractors. Additionally, embodiments of the invention pair a unique combination of fabricator, erector, and contractor for a given building size, design, and topology, to satisfy target construction metrics.

With respect to construction process documentation, embodiments of the invention support any BIM, and generate complete and detailed construction steps for the particular geometry and material of that BIM.

Hardware Environment

Figure 1:
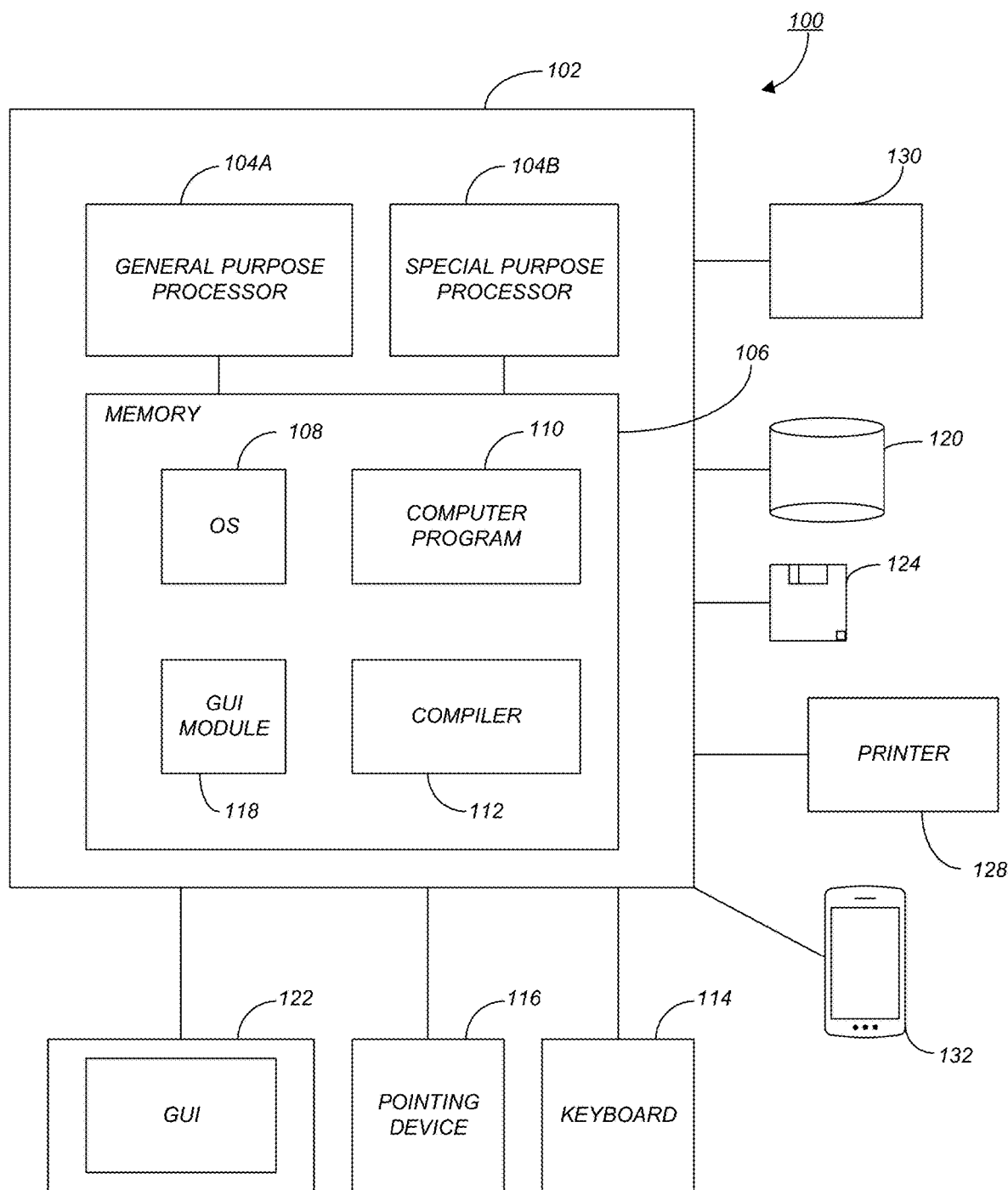
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
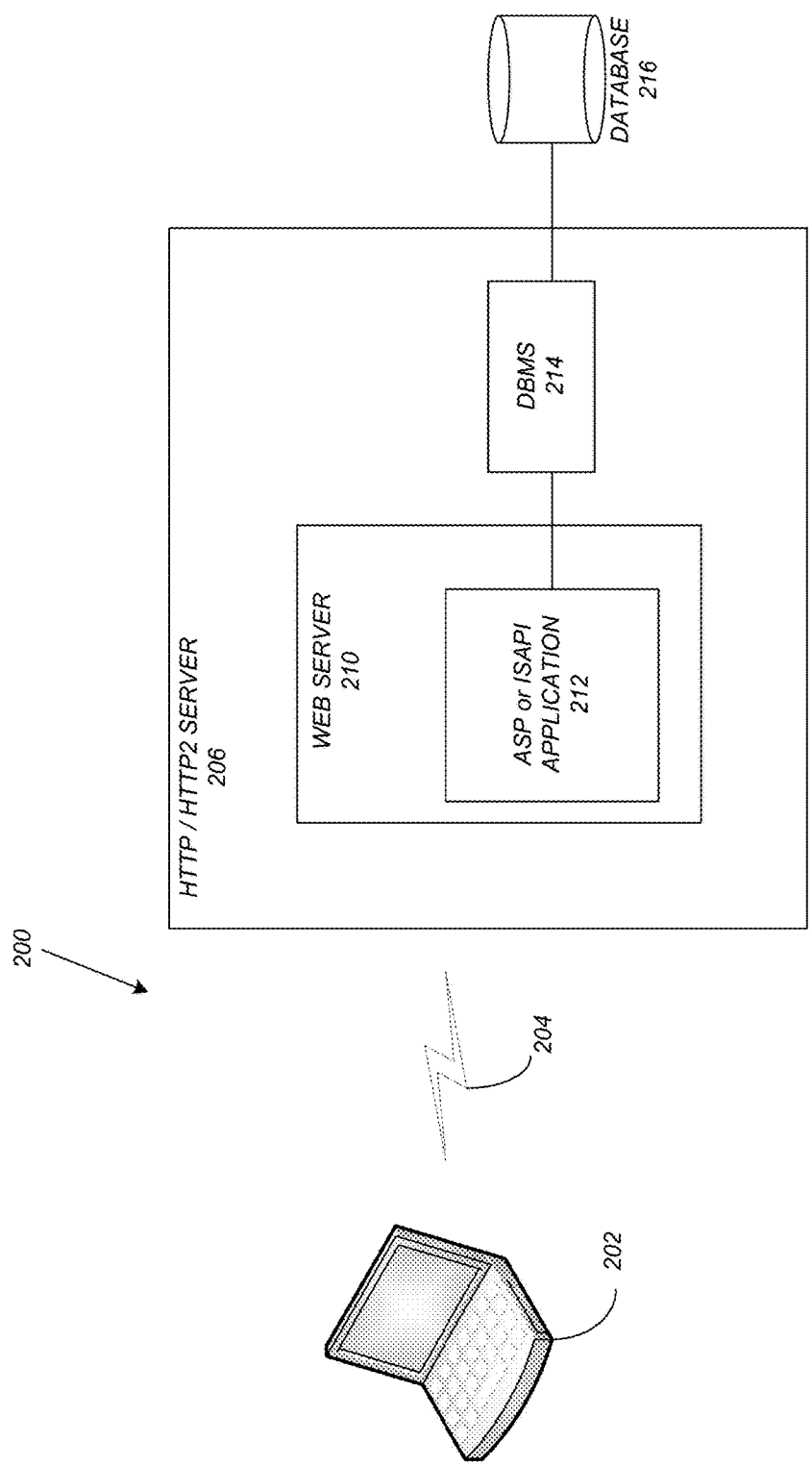
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 (e.g., also referred to herein as a cloud based server) may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

HTTP/HTTP2 server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206. In view of the above, embodiments of the invention are implemented as a software application on a client 202 or server computer 206. Further, as described above, the client 202 or server computer 206 may comprise a thin client device or a portable device that has a multi-touch-based display.

Software Embodiment Details

Figure 3A:
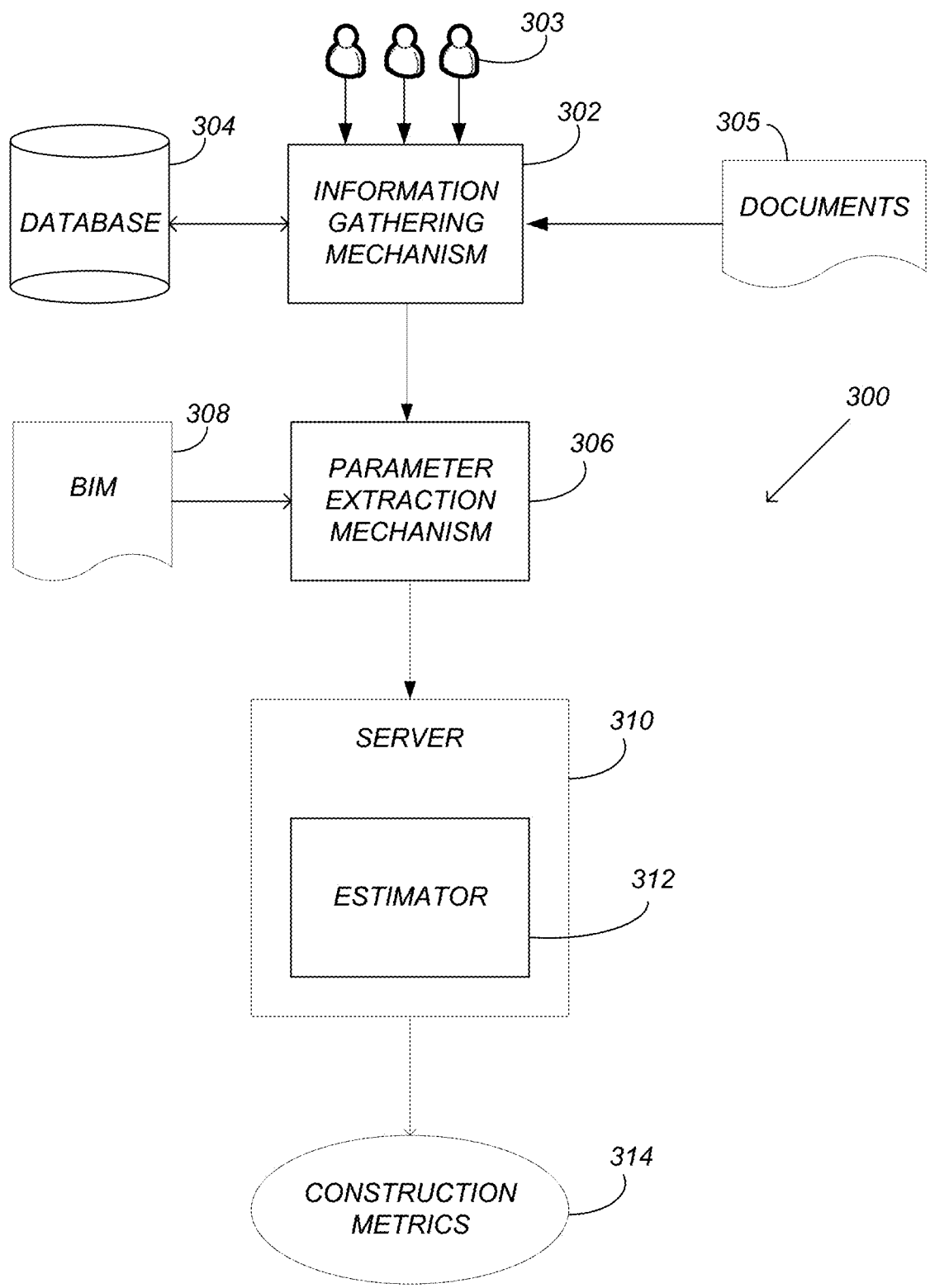
FIG. 3A illustrates the three components for creating construction metrics and documentation in accordance with one or more embodiments of the invention.

Embodiments of the invention are composed of three components that may be integrated into client 202 or server computer 206. FIG. 3A illustrates the three components for creating construction metrics and documentation in accordance with one or more embodiments of the invention.

The first component is an information gathering mechanism 302. The information gathering mechanism 302 gathers the building means, methods, and limitations of construction for a particular company 303, as well as the times and pay rate ranges for each step of a fabrication, installation, and construction process. Typical companies 303 include fabricators, erectors, material suppliers, and contractors. The mechanism 302 may consist of a website or any other type of system that can be used to collect information (e.g., a survey [electronic, telephonic, or paper], email, an app [e.g., on a cellular/tablet device], satellite/cable television system, etc.) from such companies 303. The mechanism 302 may collect information by directly interacting with a user/company 303, or may infer the information content based on actual work/estimates provided (e.g., by the user/company 303) over time, or may infer the information content from existing construction and fabrication documents 305 (drawings, CAD models, BIM), describing construction techniques using natural language processing.

The information may be stored in a structured database 304 for later access. Note that while databases may exist in the prior art, such prior art databases are not structured for and do not contain the information of the processes/steps of doing work in the construction industry. Instead, such information is contained in books, trade manuals, or internal documents. Further prior art systems fail to capture such information because there is no clear need to have a database with such information. Embodiments of the invention provide a way to use such data to calculate construction metrics (and documentation). Such a mechanism 302 enables the capture of the specific means and methods of a particular company 303 (e.g., a fabricator/installer/etc.) in a central database 304 that can be used to simulate the downstream construction process with a sufficient level of detail.

In an exemplary embodiment, the information gathering system 302 may consist of a website. A request may be transmitted to various companies 303 (e.g., contractors and/or steel fabricators) requesting input. A fabricator may authorize delivery of metric information to an engineer or other user that then inputs the information into the website (e.g., or transmits the information via a cellular device). In a steel fabrication example, a company 303 may indicate the typical length of time to complete a particular task (e.g., assemble or create a steel beam connection) along with the hourly rate associated with that task. A list of typical processes and metrics for those processes may be input into the website/information gathering mechanism 302 and stored in database 304. Information about the particular company 303 may also be input (e.g., how many welders are in the company 303, how many bolters are in the company 303 [i.e., employees that drill holes or conduct other activities relating to bolt assembly], etc.).

The second component is a parameter extraction mechanism 306. Parameter extraction mechanism 306 extracts out highly detailed fabrication and construction parameters/information from a BIM 308. The information extracted is every geometric element that requires a unit of construction or fabrication work. For example, the extraction mechanism 306 may extract out all components, sub-components, and geometry that requires work, such as edges of members requiring cutting, bolt holes requiring drilling, joints requiring welding, etc. In one or more embodiments the parameter extraction mechanism 306 consists of a set of plugins. The extraction mechanism 306 uploads the extracted information to a cloud based server 310.

The third component is a cloud-based estimator 312, where information extracted from the modeling program 308 is processed by/within server 310 to generate the construction metrics 314. This cloud-bases system 300 generates metrics without any of the fundamental rates or building logic leaving the cloud. Further, embodiments of the invention may support any BIM 308, and generates complete and detailed construction steps for the particular geometry and material of that BIM 308.

The combination of these three components (302, 306, and 312) solves the problems of generating construction metrics in at least four ways. First, specific construction metrics are generated for a particular BIM 308 in real time. Second, users are allowed to search across the industry to find a particular set of construction partners 303 to satisfy constraints on construction metrics for a particular BIM 308. Different combinations of contractors, fabricators, erectors, and supplier's fundamental rates and building logic will generate different metrics 314 for a BIM 308, and embodiments of the invention searches all of the combinations to return a best-fit set. Third, users are allowed to generate industry-wide construction metrics 314 using averages of all available fundamental rates and building logic. Fourth, the results may be visualized in a modeling platform.

In view of the above, it may be noted that prior art estimates are based off of rules of thumb or square-footage estimates. Precise construction metrics that are based on building details are not conducted. Embodiments of the invention provide more accurate construction metrics from fundamental details, and produce such metrics faster than an estimation-based process. Further, such construction metrics allows users to feed a building design into an optimization system, exploring thousands or even millions of design options, something impossible if computing such construction metrics by hand.

Further, as the system 300 is automated, the construction metrics 314 may be generated and provided upstream (i.e., to designers of a building model) earlier in the design process without actually bringing a specific contractor/fabricator/etc. 303 into the estimating process. In this regard, an anonymous construction metric 314 or generic/average construction metric 314 can be provided for a particular BIM 308. Such an estimate is based on actual details in the BIM 308 itself and not on the intuition or trade knowledge of a particular contractor.

As described above, the construction metrics 314 may be visualized. Such a visualization may create a graph of all of the labor steps to fabricate, transport, erect, and construct a building. By tabulating the time and cost rates for each step, aggregate metrics and metric ranges can be generated for a BIM 308. In addition, using this same knowledge graph, construction process documentation can be generated for each step of the fabrication, transportation, erection, and construction process of a building.

Further to the above, the construction metrics 314 and a BIM 308 itself may be optimized based on the ability to easily and automatically iterate over a significant number (e.g., hundreds, thousands, or millions) of designs. For example, an optimization system may iterate to try and find the best combination to create an optimum form for the BIM 308 (e.g., adding/subtracting steel elements). In one or more embodiments, such an optimization system may be limited to evaluating cost (i.e., overall cost including cost to fabricate/construct/etc. and the cost of materials, etc.). The optimization may also adjust the sizing of particular elements (e.g., the best shape/size/topology of a structure (e.g., 1-inch steel beam v. 3-inch steel beam, etc.).

Figure 3B:
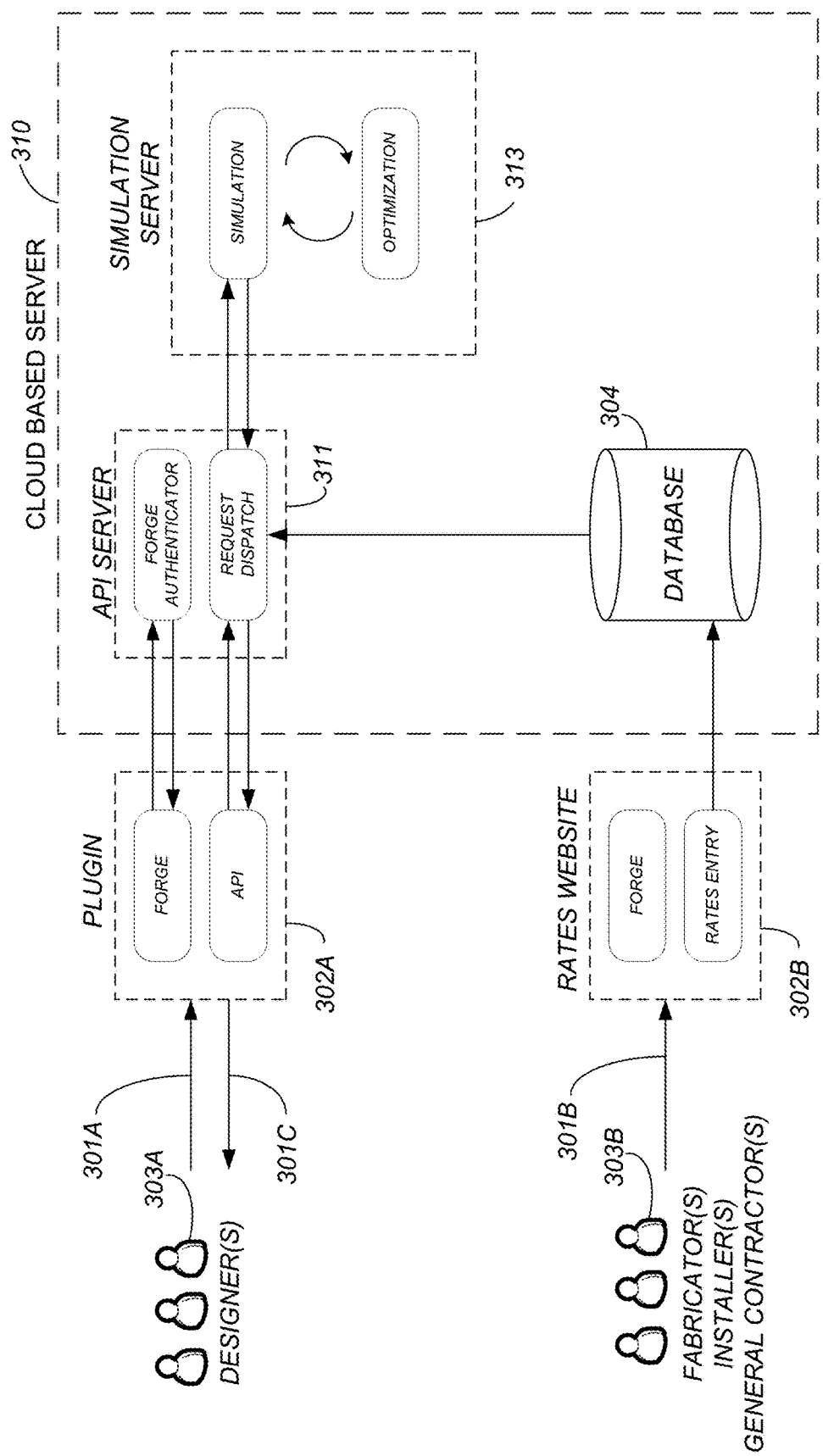
FIG. 3B illustrates a service-oriented architecture for creating construction metrics and documentation in accordance with one or more embodiments of the invention.

FIG. 3B illustrates a service-oriented architecture for creating construction metrics and documentation in accordance with one or more embodiments of the invention. As illustrated in FIG. 3B, designer(s) 303A submits a BIM(s)/extracted BIM parameter(s) 301A to the API server 311 (e.g. on a cloud based server 310) using a plugin 302A (e.g., written in C#) embedded in commercial modeling platform (e.g. REVIT). Similarly, fabricator(s)/installer(s)/general contractor(s) 303B input information 301B into the information gathering mechanism 302B. In particular, the fabricator(s)/installer(s)/general contractor(s) 303B input information into the rates website 302B (e.g., via RUBY ON RAILS). Both the plugin 302A and 302B contain an authentication mechanism to protect against fraud and impersonation by verifying the identify the designer(s) (in 302A) and/or the fabricator(s)/installer(s)/general contractor(s) (in 302B). Such an authentication mechanism typically uses OAUTH or Single Sign On (SSO) over TLS/SSL (transport security layer/secure sockets layer) (e.g. GOOGLE OAUTH 2.0 or FACEBOOK CONNECT). Plugins 302A, 302B, and API Server 311 demonstrate this authentication using FORGE, an AUTODESK authentication framework. An authentication request is gathered in 302A and/or 302B, and transmitted to the cloud based server 310 one or more times over a secure channel, resulting in 302A and/or 302B verifying the identity of the user. The ratings information is stored in database 304 (e.g. on a cloud based server 310). The information stored in database 304 is queried by the API server 311 using a request dispatch mechanism. This mechanism identifies the required information generating construction metrics and documentation, and extracts it from the database 304. In order to generate the most accurate construction metrics, the BIM(s)/extracted BIM parameter(s) submitted by designer(s) 303A is combined with information gathered from fabricator(s)/installer(s)/general contractor(s) 303B in the API server 311, and then may be sent to the simulation server 313 (which may be similar to estimator 312 of FIG. 3A). The simulation server 313 may operate via PYTHON and performs iterative simulations and optimizations. When the combination of simulation and optimization is completed in the simulation server 313, the results are returned to the API server 311. Further processing in the API server 311 generates either construction metrics or construction documentation or both. These metrics or documentation or both 301C are returned and presented visually to the designer(s) 303A via the plugin 302A.

Figure 4:
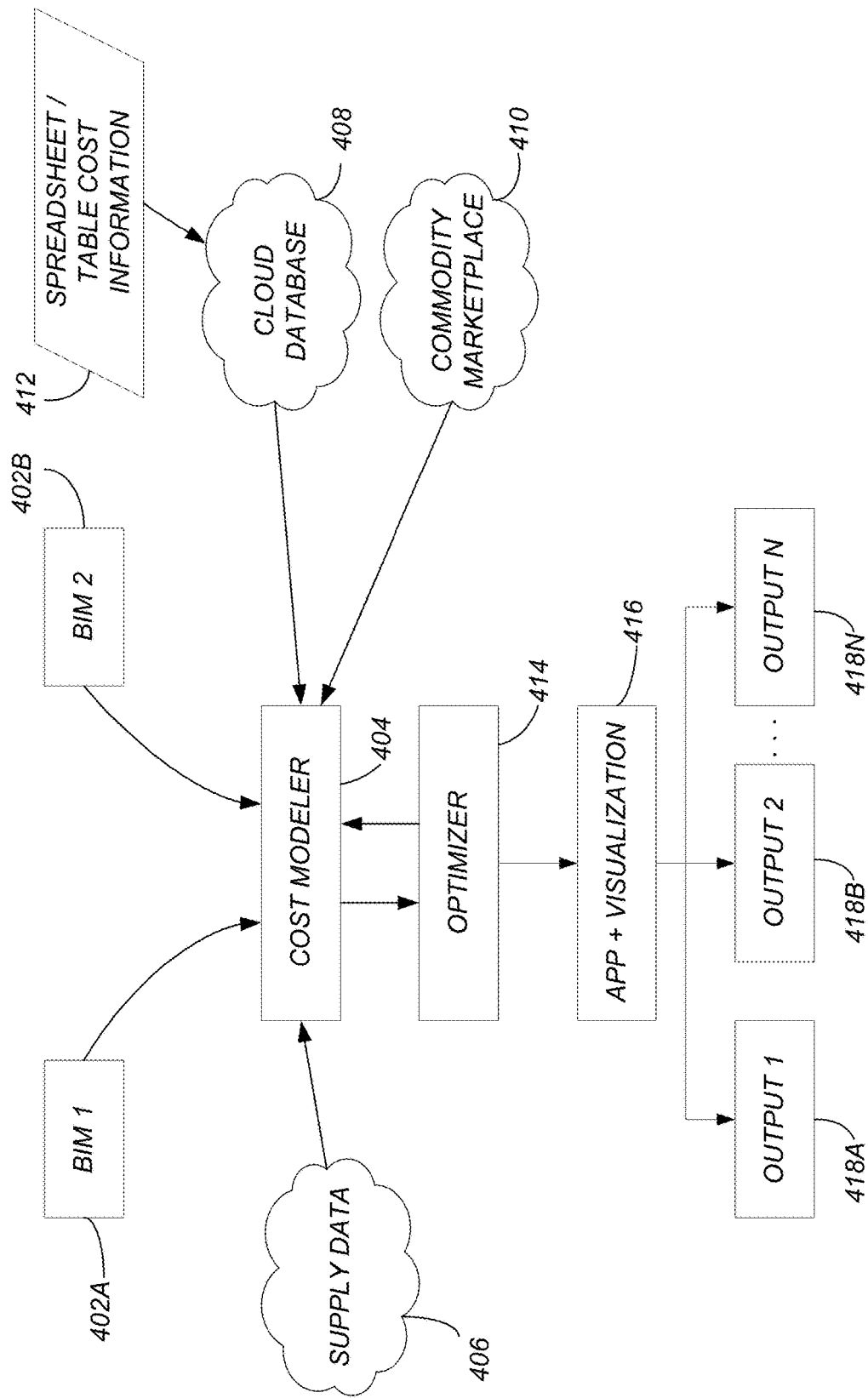
FIG. 4 illustrates an overview of a cloud-enabled system for generating construction metrics and documentation in accordance with one or more embodiments of the invention.

FIG. 4 illustrates an overview of a cloud-enabled system for generating construction metrics and documentation in accordance with one or more embodiments of the invention. The different building information modelling applications 402-402B enable the ability to design a building information model (BIM) including the selection of various components/elements to be used in a design. For example, BIM 1 402A may allow the selection of different steel member sizes while BIM 2 402B may enable the automatic selection of steel beams (e.g., for a given topology of a steel structure, the lowest weight steel beams may be selected). Such BIM information is input into a cost modeler 404.

Further input into the cost modeler 404 may include supply data 406 from various suppliers. For example, steel mills may provide supply data 406 such as steel procurement instructions and information in STEELXML (an extensible markup language [XML] schema for the electronic procurement of structural steel.

Additional input may include information from cloud database 408 and commodity marketplace 410. Cloud database 408 may include or may be equivalent to database 304 in FIG. 3. In this regard, cloud database 408 includes information provided from various companies 303 (e.g., fabricators store means and methods into cloud database 408). Cloud database 408 may also include information provided by a table/spreadsheet based estimation tool (such as spreadsheet/table cost information 412) that generation cost information from building information (e.g., correlates extracted values with unit rates gathered from material suppliers). The commodity marketplace 410 provides information relating to commodities (e.g., steel, bolts, cranes, etc.) that may be used to compute a cost for the design. Such commodity information may overlap with/be similar to the supply data 406.

Based on all of the input 402, 406, 408, and 410, the cost modeler 404 develops an overall cost for implementing the entire BIM design. In this regard, cost modeler 404 may be viewed as estimator 312 of FIG. 3. In addition, the cost modeler 404 may iterate with an optimization component/optimizer 414. Such an optimizer will utilize the various costs determined by cost modeler 404 to determine a design with the optimized (e.g., least expensive) cost within the optimization parameters provided (e.g., structural/space/material/etc. requirements). In other words, the optimizer 414 iterates in a process to determine the best/optimized combination of design components based on cost (where time spent by a company/contractor performing work may also be included in such a cost determination).

As described above, such an optimization may also include utilizing one company (e.g., a fabricator) over another company, based on, for example, the number of particular types of employees employed (e.g., company A employs 10 fabricators and 4 bolters vs. company B that employs 4 fabricators and 8 bolters) in view of the specific BIM requirements (e.g., a BIM that has more steel fabrication time-based costs and less bolt time-based costs). Alternatively, if none of the available contractors have sufficient capabilities for a particular design of the BIM, optimizer 414 (in combination with cost modeler 404) may revise the model to accommodate one or more of the available contractors. Similarly, the optimizer 414 may cycle through various designs and contractor combinations to determine the best/optimized combination (e.g., based on project time to completion, cost, etc.).

Once the optimizer 414 has determined an optimized design (that may or may not include a combination with a particular company/contractor), the application and visualization component 416 outputs the information into various formats (e.g., output 1 418A, output 2 418B, output N 418N). Exemplary formats include output readable by: modelers/design and construction software (e.g., REVIT), an internet/cloud based model viewer/BIM management and collaboration product (e.g., BIM 360), project review software (e.g., NAVISWORKS), 3D modeling software for steel detailing (e.g., ADVANCE STEEL), a conceptual BIM (e.g., FORMIT), etc.

Logical Flow

Figure 5:
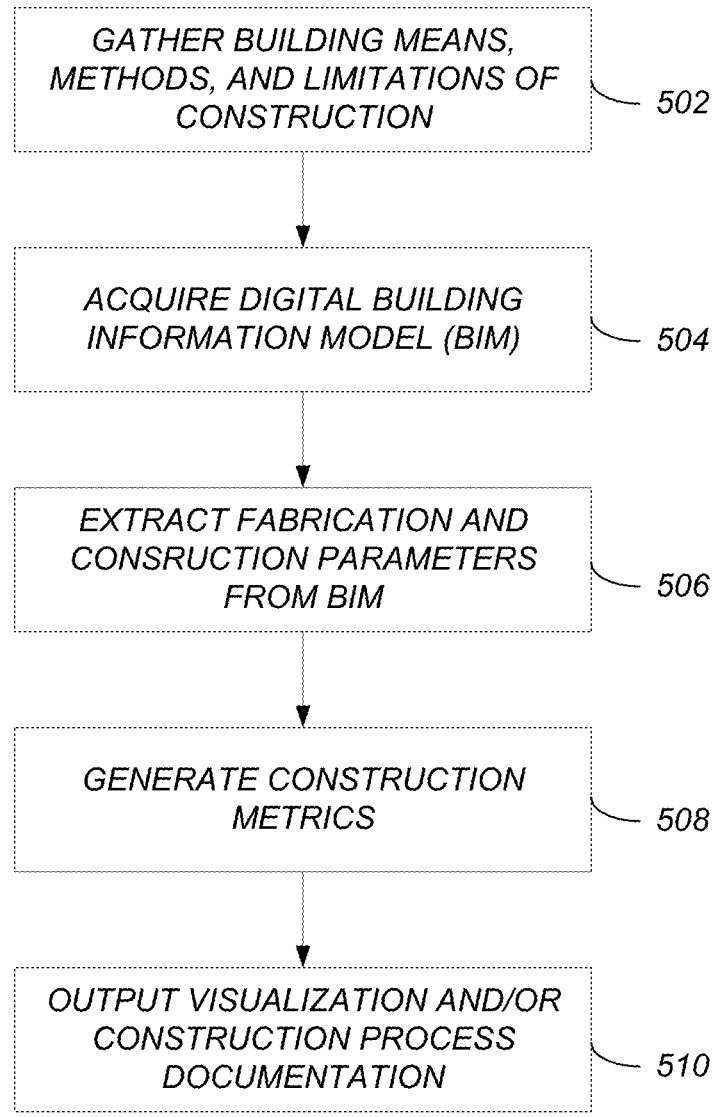
FIG. 5 illustrates the logical flow for generating construction metrics in accordance with one or more embodiments of the invention.

FIG. 5 illustrates the logical flow for generating construction metrics in accordance with one or more embodiments of the invention.

Figure 6:
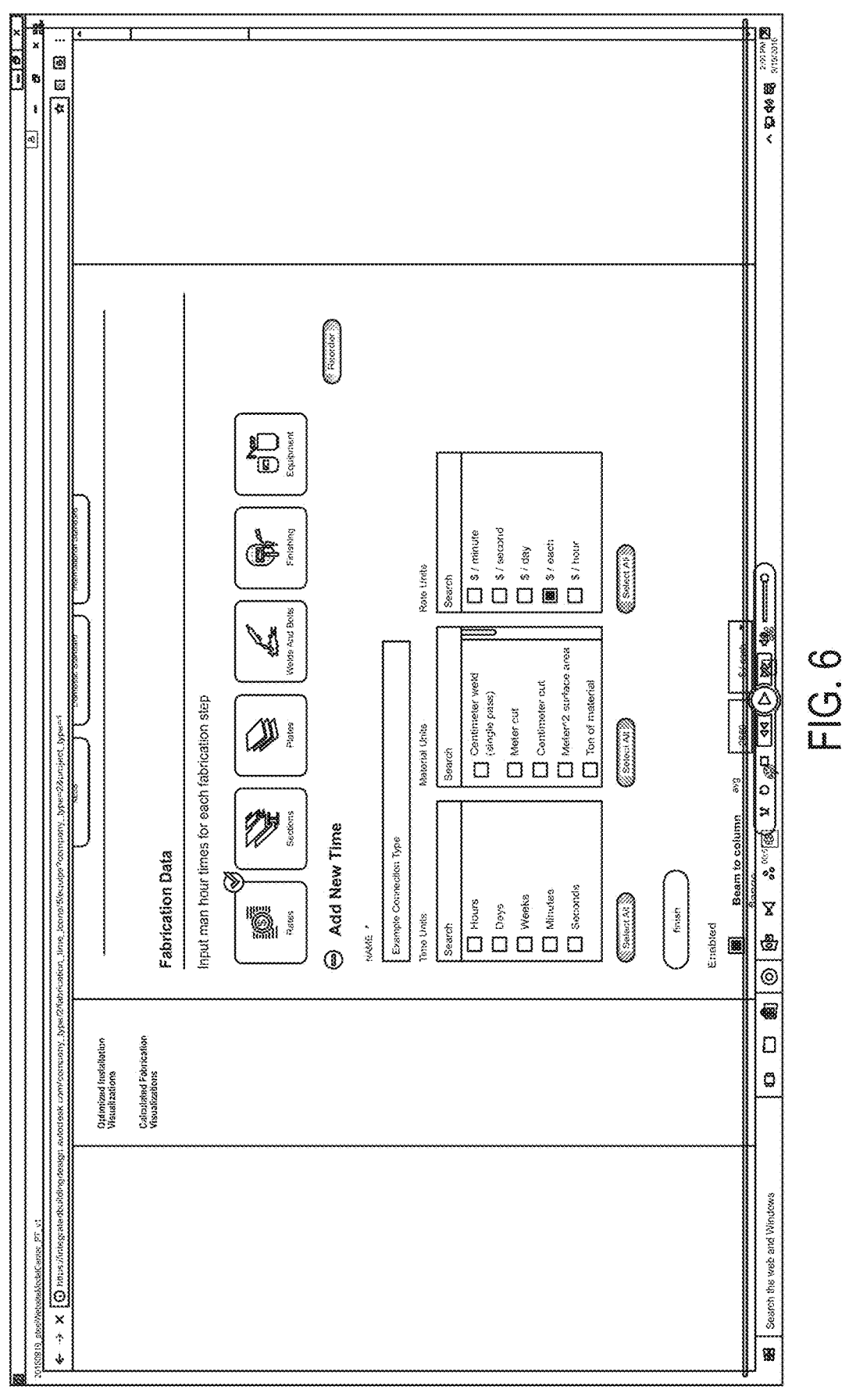
Figure 7:
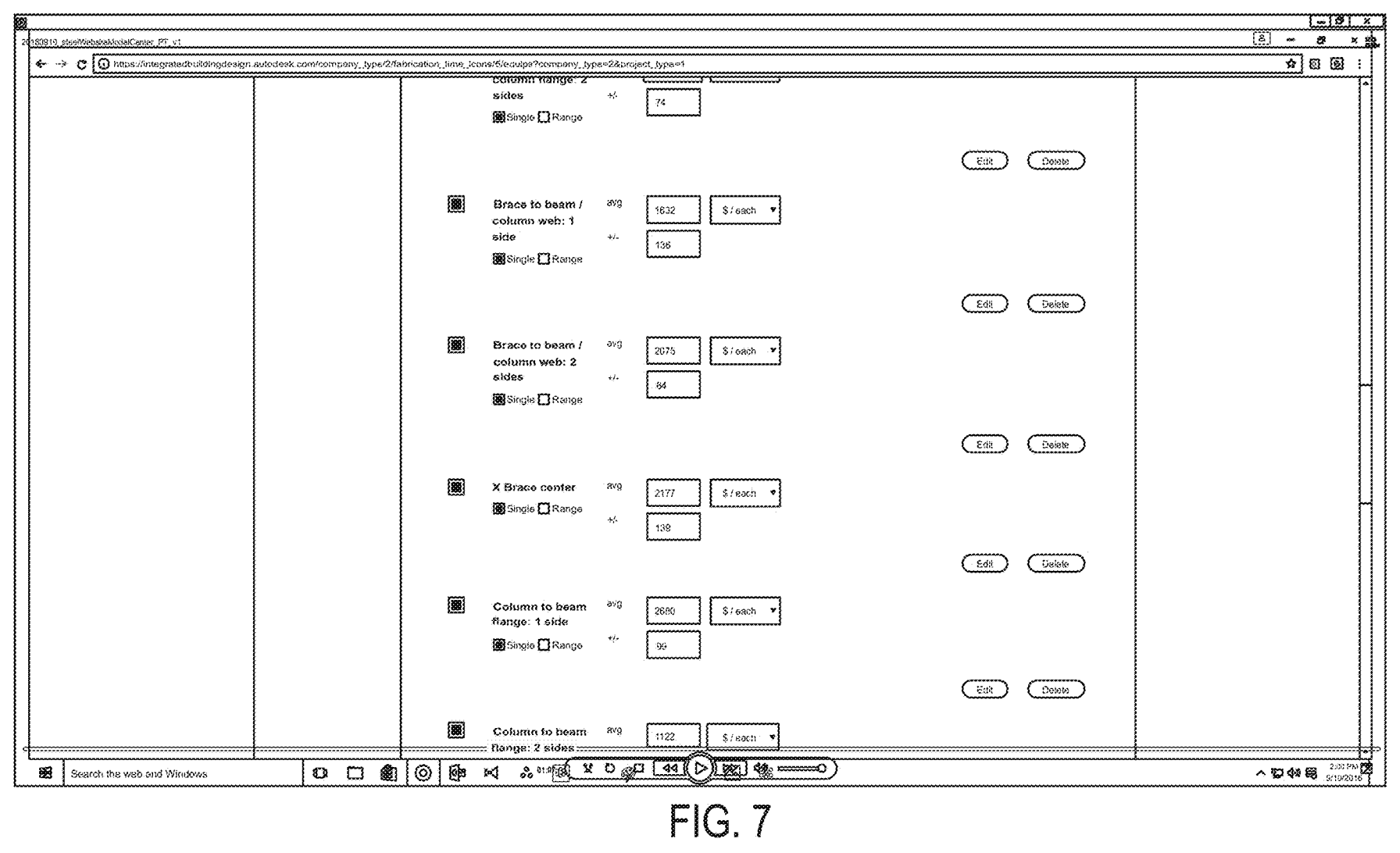

At step 502, building means, methods, and limitations of construction for one or more companies are gathered (e.g., via input into a website). Such information may include times and pay rate ranges for each step of a construction process. Step 502 may also include the storage of the building means, methods and limitations in a structured database. FIG. 6 illustrates an exemplary user interface on a website for entering such information. As illustrated, once the user indicates he/she is a fabricator, they have the option of inputting information for each fabrication step including rates, sections, plates, welds and bolds, finishing, and equipment. Further, the fabricator can enter his/her name, and details regarding the different rates. Once each rate is entered for a specific fabrication step, the user may scroll down to view/review/edit the entered information as illustrated in FIG. 7.

Step 502 may also include the storage of the building means, methods and limitations in a structured database.

At step 504, a digital BIM is acquired.

At step 506, fabrication and construction parameters are extracted from the BIM. The fabrication and construction parameters may include every geometric element in a BIM that requires a unit of construction or fabrication work. The extraction may be performed by a set of one or more plugins to a modeling application. Further, the extracting may include the upload of the extracted information to a cloud-based server.

At step 508, construction metrics for the BIM are generated by combining the building means, methods, and limitations with the extracted fabrication and construction parameters. The generating may be performed entirely within a cloud-based server system. In addition, the generating may include an optimization of the BIM. Such an optimization adjusts the fabrication and construction parameters for the BIM, combines the adjusted parameters with one or more of the companies, and iterates the adjusting and combining steps to determine an optimal configuration based on cost. The generating may also be based on an average rate across multiple companies and an average building logic across multiple BIMs. One may also note that once a rate has been edited (e.g., via the interface of FIG. 7), the construction metrics may be generated and updated dynamically in real-time.

At step 510, the construction metrics are visualized in a modeling application. In addition, step 510 may include the generation (based on the construction metrics), construction process documentation for each step of a fabrication, transportation, erection, and construction process of a building (and the outputting/printing/distributing/transmitting of such construction process documentation).

Exemplary Use Cases

Various different tracks (referred to as on-boarding processes) may be followed depending on the user (e.g., building developer, designer, or contractor). Such exemplary use cases may be explained by referencing FIG. 3B.

Building Developer Track Onboarding

A building developer may aim to construct a building at a particular location by a particular date. The developer, with the assistance of an owner's representative and/or an architect and/or a contractor, assembles a team including a designer 303A and a general contractor 303B, and any required sub-contractors such as fabricators 303B, installers 303B, erectors, etc.

The developer uses the information gathering mechanism 302 interface to invite a designer 303A, general contractor 303B, and any sub-contractors to the project. The developer specifies the project location and desired completion date in the information gathering interface (i.e., of mechanism 302). As a project develops and increases the level of detail (LOD), the owner is able to view increasingly accurate cost and time estimates (construction metrics) about the project. Such information may be visible on a website as tabular data (e.g., similar to a spreadsheet). These estimates are tailored for the particular contractors that the owner has invited to the project. Further, the simulation server 313 is able to provide such updates 313.

Designer Track Onboarding

A designer 303A is invited by a building developer to join a project. The join request may consist of a URL (uniform resource locator) link that can be sent by email, text message, etc. After clicking on the link and signing in to the information gathering interface (of information gathering mechanism 302), the designer 303A is authorized on the project.

The designer 303A installs and opens a plug-in 302A to a commercial BIM modeling software (e.g., applications such as REVIT, DYNAMO, FORMIT, SKETCHUP, TEKLA, ADVANCED STELL, or MODELCENTER). The designer 303A specifies the current project they are designing in the plug-in interface 302A (multiple building developers may have invited the designer 303A to multiple projects). Thereafter, the designer 303A creates a BIM.

The plugin 302A communicates with the server 310, sending the BIM and/or extracted BIM parameters. The server 310 correlates these parameters with the rates input by a contractor 303B to generate construction metrics (that are stored in database 304).

Figure 8:
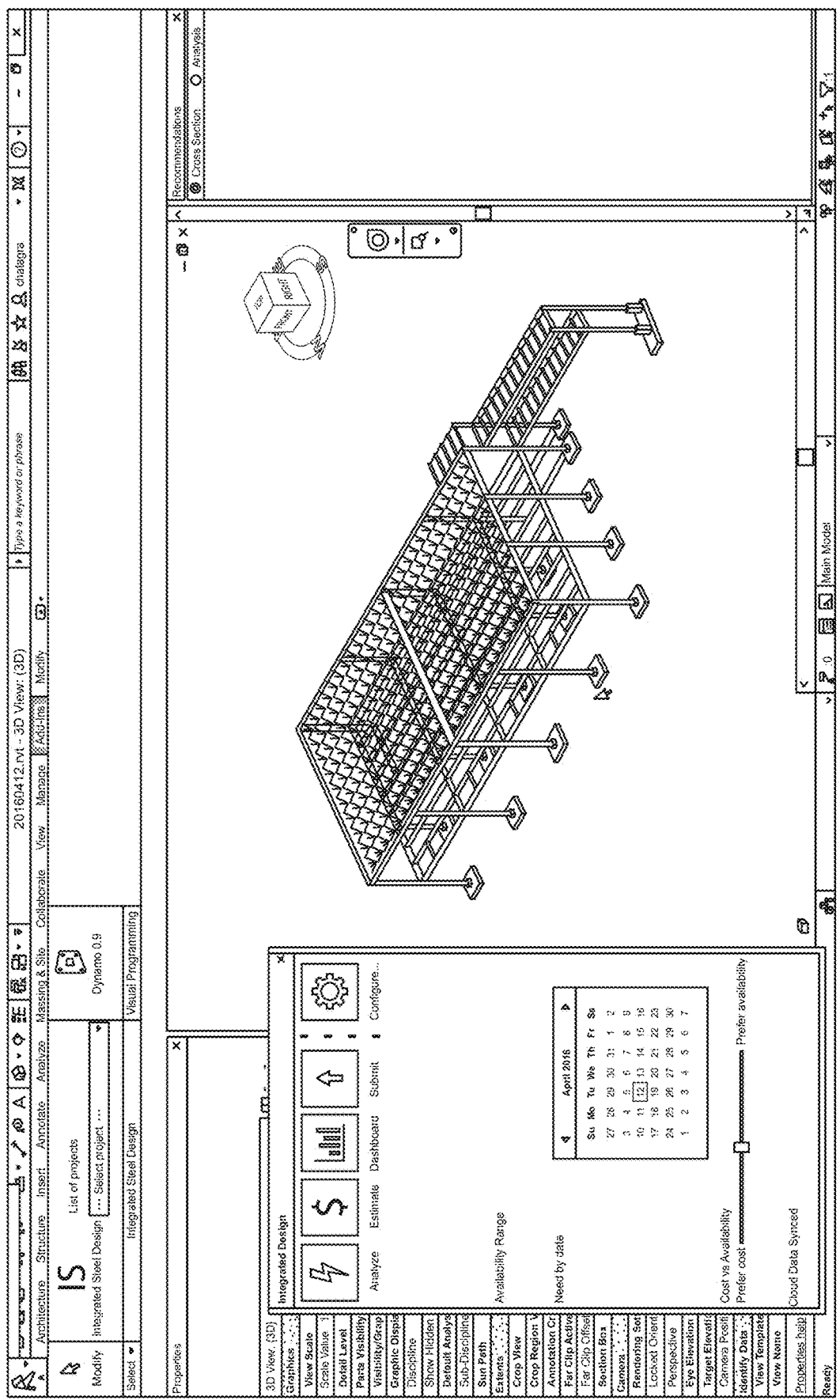
FIG. 8 illustrates a visualized BIM that reflects construction metrics in accordance with one or more embodiments of the invention.

The generated construction metrics may be displayed in the interface (via the simulation server 313) that are provided back 301C to the designer 303A. These metrics can be displayed as coloring on the BIM elements (e.g., highlighting expensive elements red, or elements that cannot be acquired by the project completion date magenta), or in a tabular form similar to a spreadsheet. The designer 303A modifies their design based on the construction metrics feedback. FIG. 8 illustrates a visualized BIM that reflects construction metrics in accordance with one or more embodiments of the invention. The designer 303A may also use the construction metrics as a component to the fitness function of an optimization system (i.e., within simulation server 313). Such optimization may alter design parameters to find a design that has the optimum cost (e.g., the lowest cost).

Contractor and Sub-Contractor Track Onboarding

The contractor 303B and/or sub-contractor may be invited by the building developer to join a project. Contractors 303B and sub-contractors can subsequently invite other sub-contractors or sub-sub-contractors who will be working on a project. Similar to above, the join request may consist of a URL link that can be sent by email, text message, etc. After clicking on the link, and signing in to the information gathering interface, the contractor/sub-contractor 303B is authorized on the project.

The contractor 303B uses the information gathering mechanism 302 interface (e.g., the rates website 302B) to input the details of their work practices. For instance, a steel fabricator using the web interface may input information about how long it takes to cut a steel beam, and how much that tradesman costs per unit of time. Other information they may input are the particular types of steel connections they are equipped to fabricate. If any of the fundamental rates changes during the design process of the project, the contractor 303B can simply input new rates. This rate information is stored in database 304.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to generate construction metrics and documentation in real-time dynamically across the industry for many contractors, while also generating construction process documentation. The ability to offer the combination of construction insights/metrics, and comprehensive documentation provides significant advantages over prior art systems. For example, advantages may include the ability to design cheaper buildings with a particular CAD/BIM platform (e.g., while also providing benefits such as structural code compliance and LEED [Leadership in Energy & Environmental Design] certification).

Further to the above, embodiments of the invention may incorporate construction simulation into the system. Similar to generating construction documentation (e.g., in the form of 2D drawings and 3D models), animations may be generated specifically showing the process of construction. In addition, natural language processing may be utilized. In particular, general construction documents (e.g., a company's best practices, contracts with sub-contractors, how-to guides, manuals, etc.) may be taken and used to generate the required information to drive the construction metrics system. Also, using the same gathered information, tool paths (e.g., G-CODE) may be generated to operated CNC (computer numeric control) machines. This would enable fabrication directly from a BIM based on the specifications of a fabricator stored in the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for generating construction metrics, comprising:
   (a) gathering, in a computer, work practices for one or more companies, wherein:

(1) the work practices comprise building means, methods and limitations of construction;
(2) the building means, methods and limitations of construction comprise;
   (i) specific means and methods of a construction process for the one or more companies; and
   (ii) a length of time to perform the methods;
(3) the limitations comprise limitations of construction and limitations of types of construction for each of the one or more companies;
(4) the building means, methods, and limitations of construction are independent of a particular building information model (BIM);
(5) the work practices are gathered independently from a digital BIM that is used to generate construction metrics;
(b) acquiring, in the computer, a digital BIM;
(c) extracting, in the computer, fabrication and construction parameters from the digital BIM, wherein the fabrication and construction parameters comprise every geometric element that requires a unit of construction or fabrication work;
(d) automatically generating, in the computer, the construction metrics for the digital BIM by:
   (1) combining the building means, methods, and limitations with the extracted fabrication and construction parameters, wherein the construction metrics comprise the cost and construction time for a project of the digital BIM;
   (2) optimizing the digital BIM by:
      (i) adjusting the fabrication and construction parameters for the digital BIM;
      (ii) combining the adjusted fabrication and construction parameters for the digital BIM with one or more of the one or more companies; and
      (iii) iterating the adjusting and combining steps to determine an optimal configuration based on cost, wherein the optimal configuration is for an optimized digital BIM; and
   (3) automatically generating, in the computer, the construction metrics for the optimized digital BIM;
(e) visualizing and displaying the construction metrics in a modeling application.

2. The computer-implemented method of claim 1, wherein the adjusting the fabrication and construction parameters comprises adding or subtracting construction elements to create an optimum form of the digital BIM.

3. The computer-implemented method of claim 1, wherein the adjusting the fabrication and construction parameters comprises adjusting a sizing of particular elements of the digital BIM.

4. The computer-implemented method of claim 1, wherein the cost comprises time spent by a worker to perform work in physically constructing a building based on the digital BIM.

5. The computer-implemented method of claim 1, wherein the iterating comprises selecting one company over another company based on a number of particular types of employees employed.

6. The computer-implemented method of claim 1, wherein the iterating comprises cycling through design-contractor combinations to determine the optimized configuration.

7. The computer-implemented method of claim 1, wherein the generating is performed entirely within a cloud-based server system.

8. The computer-implemented method of claim 1, wherein the generating is performed in real-time for a particular selected BIM.

9. The computer-implemented method of claim 1, wherein the generating is based on an average rate across the one or more companies and an average building logic across multiple BIMs.

10. The computer-implemented method of claim 1, further comprising:
   generating, based on the construction metrics for the BIM, construction process documentation for each step of a fabrication, transportation, erection, and construction process of a building.

11. A computer-implemented system for generating construction metrics, comprising:
(a) a website that gathers work practices for one or more companies, wherein:
   (1) the work practices comprises building means, methods and limitations of construction;
   (2) the building means, methods and limitations of construction comprise;
      (A) specific means and methods of a construction process for the one or more companies; and
      (B) a length of time to perform the methods;
   (3) the building means, methods, and limitations of construction are independent of a particular building information model (BIM);
   (4) the limitations comprise limitations of construction and limitations of types of construction for each of the one or more companies
   (5) the work practices are gathered independently from a digital BIM that is used to generate construction metrics;
(b) a modeling application executing on a computer that acquires a digital BIM;
(c) a set of one or more plugins to the modeling application that:
   (1) extract fabrication and construction parameters from the digital BIM, wherein the fabrication and construction parameters comprise every geometric element that requires a unit of construction or fabrication work;
(d) an optimizer that optimizes the digital BIM and generates construction metrics for the digital BIM by:
   (1) combining the building means, methods, and limitations with the extracted fabrication and construction parameters; and
   (2) adjusting the fabrication and construction parameters for the digital BIM;
   (3) combining the adjusted fabrication and construction parameters for the digital BIM with one or more of the one or more companies; and
   (4) iterating the adjusting and combining steps to determine an optimal configuration based on cost, wherein the optimal configuration is for an optimized digital BIM; and
   (5) automatically generating, in the computer, the construction metrics for the optimized digital BIM, wherein the construction metrics comprise a cost and construction time for a project of the digital BIM; and
wherein the modeling application is further configured to visualize and display the construction metrics,
(e) visualizing and displaying the construction metrics in a the modeling application.

12. The computer-implemented system of claim 11, wherein the optimizer adjusts the fabrication and construction parameters by adding or subtracting construction elements to create an optimum form of the digital BIM.

13. The computer-implemented system of claim 11, wherein the optimizer adjusts the fabrication and construction parameters by adjusting a sizing of particular elements of the digital BIM.

14. The computer-implemented system of claim 11, wherein the cost comprises time spent by a worker to perform work in physically constructing a building based on the digital BIM.

15. The computer-implemented system of claim 11, wherein the optimizer iterates by selecting one company over another company based on a number of particular types of employees employed.

16. The computer-implemented system of claim 11, wherein the optimizer iterates by cycling through design-contractor combinations to determine the optimized configuration.

17. The computer-implemented system of claim 11, wherein the optimizer generates the construction metrics entirely within a cloud-based server system.

18. The computer-implemented system of claim 11, wherein the optimizer generates the construction metrics in real-time for a particular selected BIM.

19. The computer-implemented system of claim 11, wherein the optimizer generates the construction metrics is based on an average rate across the one or more companies and an average building logic across multiple BIMs.

20. The computer-implemented system of claim 11, wherein the optimizer further:
   generates, based on the construction metrics for the BIM, construction process documentation for each step of a fabrication, transportation, erection, and construction process of a building.

* * * * *